United States Patent
Zeitler et al.

(10) Patent No.: US 7,413,071 B2
(45) Date of Patent: Aug. 19, 2008

(54) CONVEYOR INDUCTION SUBSYSTEM AND METHOD OF INDUCTING ARTICLES USING FEEDBACK-GAPPERS

(75) Inventors: David W Zeitler, Caledonia, MI (US); Martin R Doane, Rockford, MI (US); Douglas L Milliman, Hastings, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 11/683,618

(22) Filed: Mar. 8, 2007

(65) Prior Publication Data

US 2007/0144868 A1 Jun. 28, 2007

Related U.S. Application Data

(62) Division of application No. 10/958,955, filed on Oct. 5, 2004, now Pat. No. 7,191,895.

(60) Provisional application No. 60/509,359, filed on Oct. 7, 2003.

(51) Int. Cl.
*B65G 43/00* (2006.01)

(52) U.S. Cl. .................. 198/460.1; 198/572; 198/461.1

(58) Field of Classification Search .............. 198/460.1, 198/461.1, 461.2, 461.3, 572, 575, 577, 608
See application file for complete search history.

(56) References Cited

U.S. PATENT DOCUMENTS

| | | | |
|---|---|---|---|
| 3,485,339 A | 12/1969 | Lowell et al. | |
| 3,944,049 A | 3/1976 | Graybill | |
| 4,358,472 A | 11/1982 | Small et al. | |
| 4,884,696 A | 12/1989 | Peleg | |
| 4,905,512 A | 3/1990 | Hayashi | |
| 5,038,911 A | 8/1991 | Doane et al. | |
| 5,172,091 A | 12/1992 | Arnold et al. | |
| 5,267,638 A | 12/1993 | Doane | |
| 5,311,977 A | 5/1994 | Dean et al. | |
| 5,341,916 A | 8/1994 | Doane et al. | |

(Continued)

OTHER PUBLICATIONS

International Search Report (Form PCT/ISA/210) from corresponding PCT Application No. PCT/US2004/032805, dated Feb. 4, 2005.

(Continued)

*Primary Examiner*—James R Bidwell
(74) *Attorney, Agent, or Firm*—Van Dyke, Gardner, Linn & Burkhart, LLP

(57) ABSTRACT

An induction subsystem for a conveyor sortation system and method of inducting articles includes providing a plurality of tandem conveying surfaces. The speeds of the conveying surfaces are individually controllable. At least one sensor is provided for sensing articles on at least one of the conveying surfaces. A control is responsive to the at least one sensor for controlling the speeds of said conveying surfaces in a manner that controls relative positions of articles. The control defines a plurality of feedback-gapping algorithms. Each of the feedback-gapping algorithms is defined between adjacent conveying surfaces for adjusting relative speeds of those adjacent conveying surfaces as a function of at least one parameter of the articles. The control controls relative positions of articles with the feedback-gapping algorithms beginning with a pair of adjacent conveying surfaces and cascading through adjacent pairs of adjacent conveying surfaces.

26 Claims, 12 Drawing Sheets

U.S. PATENT DOCUMENTS

| | | | |
|---|---|---|---|
| 5,594,184 | A | 1/1997 | Schroder et al. |
| 5,761,070 | A | 6/1998 | Conners et al. |
| 6,471,044 | B1 | 10/2002 | Isaacs et al. |
| 6,513,641 | B1 | 2/2003 | Affaticati et al. |
| 6,629,593 | B2 | 10/2003 | Zeitler |
| 6,711,461 | B2 | 3/2004 | Flores |
| 6,718,227 | B1 | 4/2004 | Schemmel et al. |
| 6,749,391 | B2 | 6/2004 | Woodruff et al. |
| 6,751,524 | B2 | 6/2004 | Neary et al. |
| 6,852,991 | B2 | 2/2005 | Pastor et al. |
| 6,897,625 | B2 | 5/2005 | Brixius et al. |
| 6,898,486 | B2 | 5/2005 | Watanabe et al. |
| 6,958,465 | B2 | 10/2005 | Haberer et al. |
| 7,081,713 | B2 | 7/2006 | Jurs et al. |
| 7,168,552 | B2 * | 1/2007 | Katayama ................ 198/460.1 |
| 7,191,955 | B2 | 3/2007 | Zeitler et al. |
| 7,264,109 | B2 * | 9/2007 | Raque et al. ............. 198/460.1 |
| 7,280,889 | B2 * | 10/2007 | Knepple et al. ............. 700/224 |
| 2003/0168316 | A1 | 9/2003 | Knepple et al. |
| 2004/0065526 | A1 | 4/2004 | Zeitler |

OTHER PUBLICATIONS

Written Opinion of the International Searching Authority (Form PCT/ISA/237), mailed Feb. 15, 2005.

* cited by examiner $$x_t = Ax_{t-1} + Bu_{t-1} + w_{t-1}$$
$$y_t = Hx_t + v_t$$
$$w \sim N(\underline{0}, Q)$$
$$v \sim N(\underline{0}, R)$$

$$A = \begin{pmatrix} 1 & \delta & 0 \\ 0 & 1 & 0 \\ 0 & 0 & 1 \end{pmatrix} \quad A_0 = \begin{pmatrix} 1 & \frac{\delta}{2} & 0 \\ 0 & 1 & 0 \\ 0 & \delta & 1 \end{pmatrix}$$

$\delta$= delta time since last prediction. Use $A_0$ until length is known.

States (x):
1: Midpoint Position
2: Velocity
3: Length $$Q = \begin{pmatrix} 1mm^2 & 0 & 0 \\ 0 & 1fpm^2 & 0 \\ 0 & 0 & 1mm^2 \end{pmatrix}$$

The values of Q control how tight the filter can lock into a constant. Values too small can prevent it from tracking accelerations after periods of stable velocity.

Input (u) is taken as the difference between measured load speed and input belt speed. It can be interpreted as slip.

$$u = (0 \ 0 \ 1)y - (0 \ 1 \ 0)x$$
$$B = \begin{pmatrix} 0 \\ Bk \\ 0 \end{pmatrix} \quad Bk = 0.02$$

Use Bk = 0.02 for light bar operation and Bk = 1.0 for pure prediction outside of light bar view.

Leading edge only input matrices:

$$H_l = \begin{pmatrix} 1 & 0 & \frac{1}{2} \end{pmatrix} \quad R_l = (10mm)^2$$

Trailing edge only input matrices:

$$H_t = \begin{pmatrix} 1 & 0 & -\frac{1}{2} \end{pmatrix} \quad R_l = (10mm)^2$$

Both edges input matrices $$H_b = \begin{pmatrix} 1 & 0 & \frac{1}{2} \\ 1 & 0 & -\frac{1}{2} \end{pmatrix} \quad R_b = \begin{bmatrix} (10mm)^2 & 0 \\ 0 & (10mm)^2 \end{bmatrix}$$

Updates at photoeyes will possibly require different R matrices and possibly even different H matrices due to the difference in timing for data acquisition.

V = current best estimate of package velocity, probably equal to controlling belt velocity.
L = current best estimate of package length. Set to zero if length unknown and let length 'build' as the package enters the light bar (if in light bar tracking).
When leading and trailing edges known: $E_l$=initial leading edge, $E_t$=initial trailing edge, M = ($M_l$ + $M_t$)/2

$$P_0 = \begin{bmatrix} 100mm^2 & 0 & 0 \\ 0 & (10fpm)^2 & 0 \\ 0 & 0 & 100mm^2 \end{bmatrix}$$

Relatively large initial variances allow rapid capture.

$$x_0 = \begin{pmatrix} M \\ V_0 \\ L \end{pmatrix}$$

Initialize on load separation will require different values for $x_0$

Fig. 6

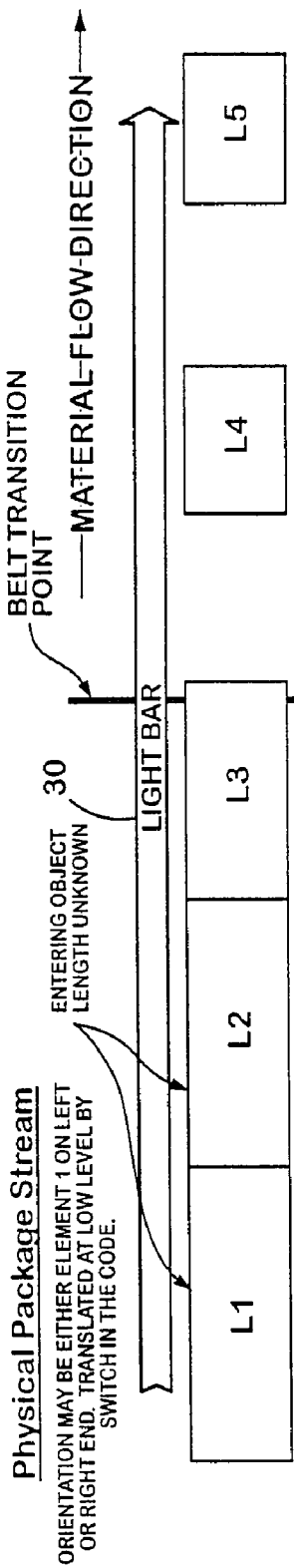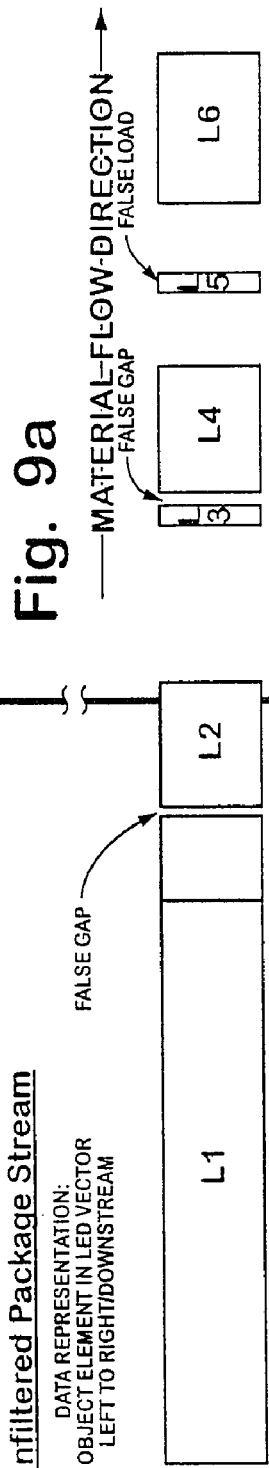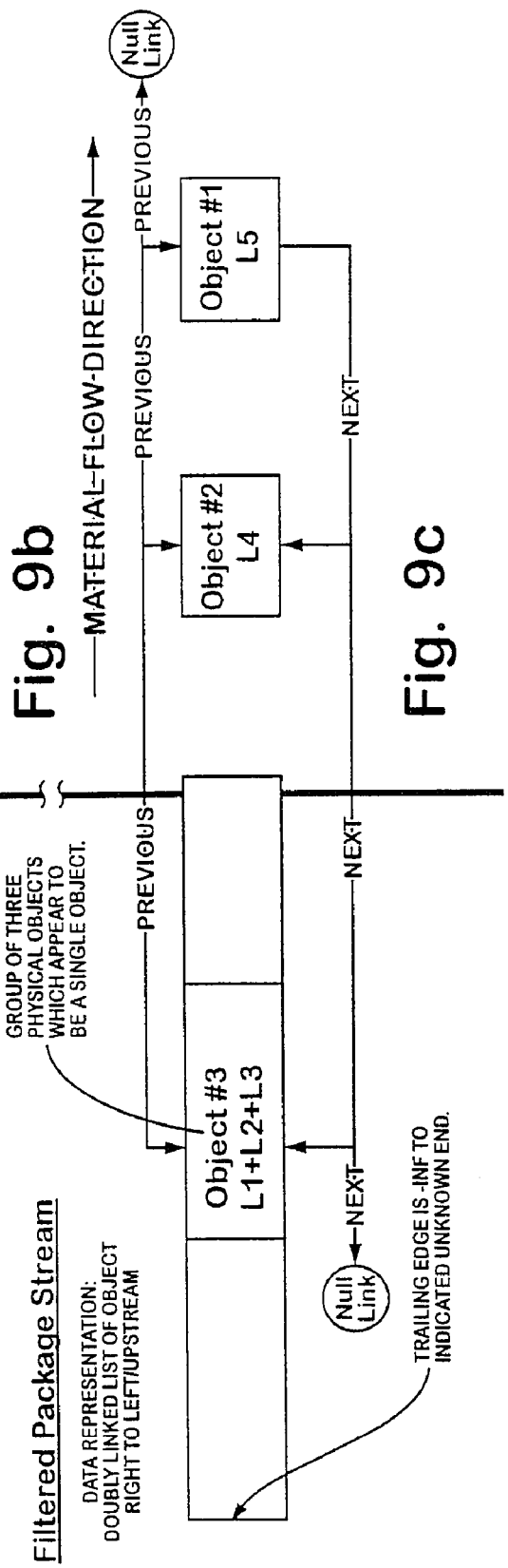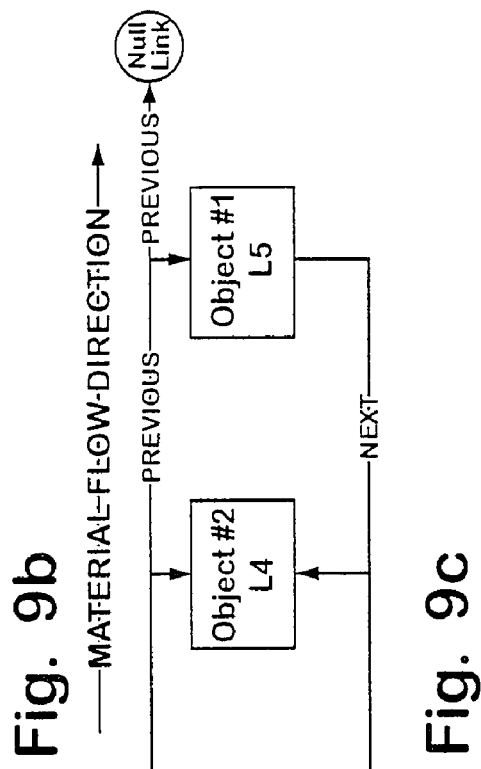
Fig. 9a
Fig. 9b
Fig. 9c

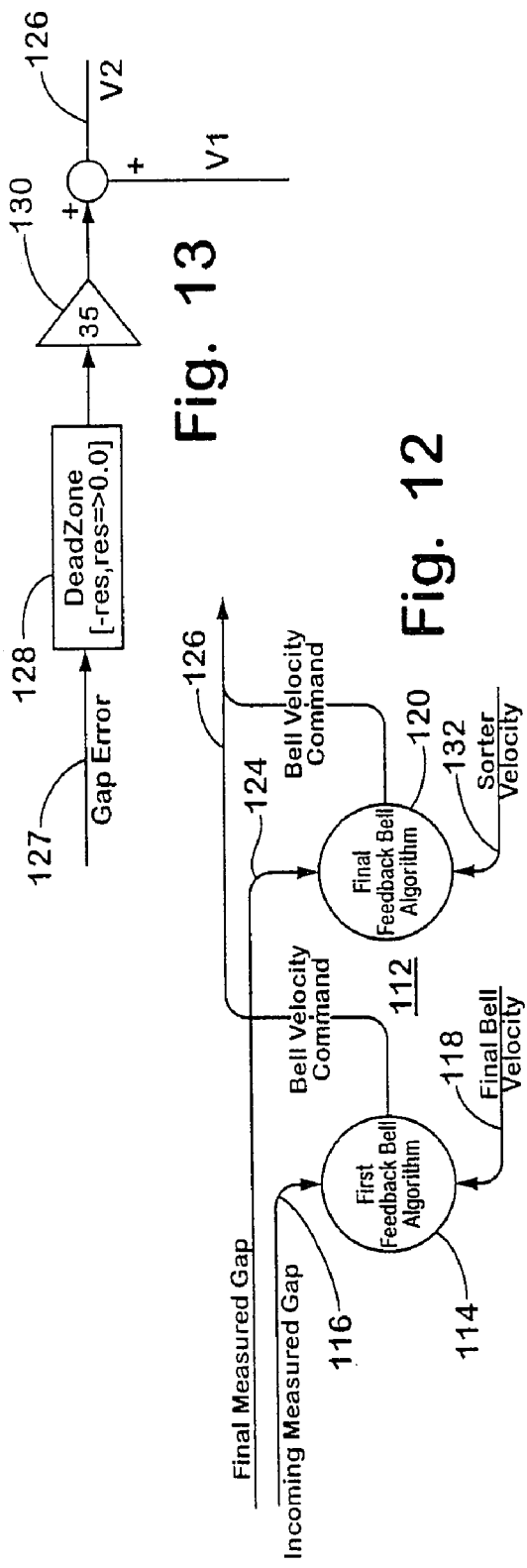
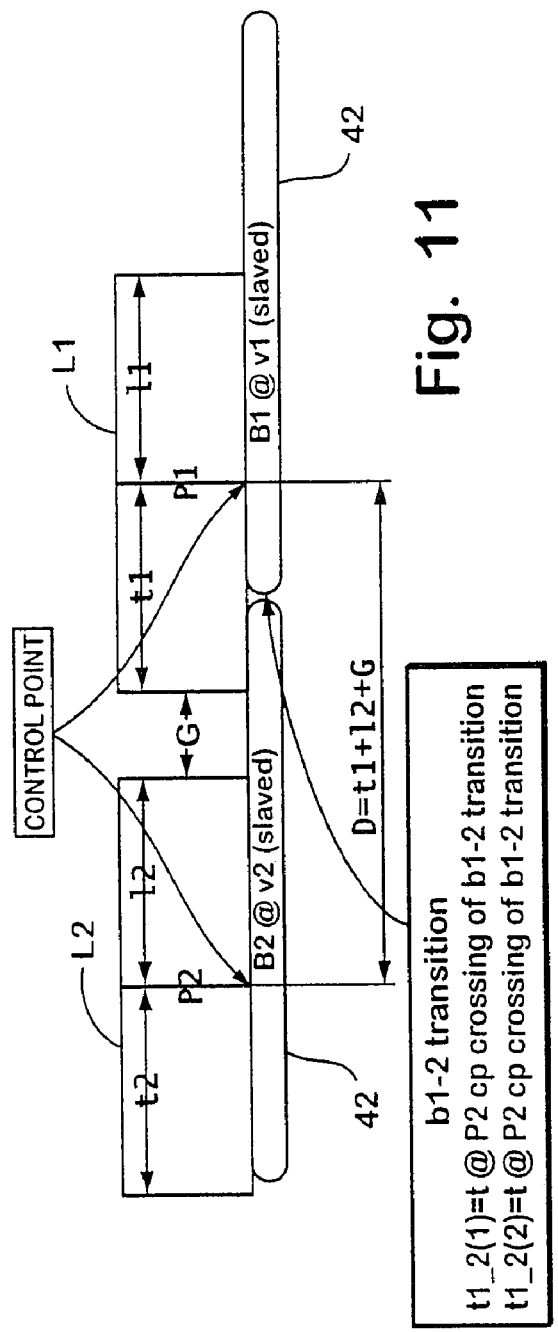

CONVEYOR INDUCTION SUBSYSTEM AND METHOD OF INDUCTING ARTICLES USING FEEDBACK-GAPPERS

CROSS REFERENCE TO RELATED APPLICATIONS

This application is a division of U.S. patent application Ser. No. 10/958,955, filed on Oct. 5, 2004, now U.S. Pat. No. 7,191,895, which claims priority from U.S. provisional patent application Ser. No. 60/509,359, filed on Oct. 7, 2003.

BACKGROUND OF THE INVENTION

This invention relates generally to conveyor systems, and in particular to the induction section of a conveyor sortation system.

The induction section of a conveyor system generally refers to the portion of the conveying system in which articles are inducted, or initiated, into the conveying sortation system. The induction section typically performs the function of providing the proper gaps between packages, or other articles traveling on the conveying system, so that the packages can be sorted for proper distribution. The gapping of the articles affects the throughput of the conveying system, which is often a factor of high commercial significance. By reducing the gaps between articles on the conveying system, the number of articles that can be placed on the conveying system at a given time is increased. By being able to place more articles on the conveying system at a given time, more articles are moved over a given time period, thus increasing the throughput of the conveying system.

The gapping of the articles also affects the sortation functions of the conveying system. Where the conveying system functions to sort the articles being conveyed, prior art conveying systems have often used pusher shoes or other diverting means to push the articles off of a main conveyor onto one or more branch conveyors. In order for these pusher shoes to sort the packages correctly, it is important that sufficient space be provided between articles so that the pushers do not inadvertently push against another article while they are in the process of diverting a second article.

The sortation functions of the conveying system therefore weigh in favor of providing a certain amount of gapping between articles while the throughput considerations weigh in favor of reducing this gapping to as small a space as possible. The induct portion of the conveying system should be able to consistently and accurately produce gaps that were just large enough to accommodate the gapping requirements of the sortation section of the conveying system as often as possible.

The creation of gaps in prior art conveying systems may suffer because these prior art conveying systems are not able to determine the position of articles on the conveyors with sufficient accuracy. For example, in some prior art conveying systems, the position of the article is determined by sensing the passing of the article by a single photo-detector positioned alongside the conveyor. As the article moves past the single photo-detector, its position is determined how far the conveyor belt had moved since the article had been detected. Determining how far the conveyor belt had moved is often carried out by way of an encoder that measured the amount of rotations of the motor that powered the conveyor belt or one that measures movement of the conveyor belt directly. Due to measurement inaccuracies, slippage, and other factors, this calculation of the article's position on the conveyor has a significant uncertainty. This uncertainty of the article's position on the conveyor makes controlling the created gaps in prior art induct systems difficult.

In light of the foregoing disadvantages of the prior art, the need for an induct system that improves the accuracy and consistency of the created gaps between articles can therefore be seen.

SUMMARY OF THE INVENTION

A conveyor system and method of conveying articles, according to an aspect of the invention, includes providing a conveying surface for conveying a series of articles and at least one sensor for sensing the articles on the conveying surface. A control is provided which establishes at least one parameter for each of the articles and controls the conveying surface as a function of the at least one parameter of each of the articles. The control includes a microcomputer and a program for the microcomputer. The program includes at least one probability estimator. The control determines the at least one parameter of each of the articles at least in part by the at least one probability estimator.

A conveyor system and method of conveying articles, according to another aspect of the invention, includes providing a conveying surface for conveying a series of articles and at least one sensor for sensing the articles on a conveying surface. A control is provided that is responsive to the at least one sensor and establishes at least one parameter of each of the articles. The control controls the conveying surface as a function of the at least one parameter of each of the articles. The control includes a microcomputer and a program for the microcomputer. The control assigns a probability estimator to individual articles. The control estimates the at least one parameter for a particular article using the probability estimator assigned to that article.

An induction subsystem for a conveyor sortation system and a method of gapping articles, according to another aspect of the invention, includes providing a plurality of tandem conveying surfaces, a speed of each of the conveying surfaces being individually controllable. At least one scanning image sensor is provided for sensing articles on at least one of the conveying surfaces. A control is provided that is responsive to the at least one scanning image sensor for controlling the speeds of the conveying surfaces. The control processes an output of the at least one scanning image sensor utilizing probability estimating.

An induction subsystem for a conveying sortation system and a method of gapping articles, according to another aspect of the invention, includes providing a plurality of tandem conveying surfaces, a speed of each conveying surface being individually controllable. At least one scanning imaging sensor is provided for sensing articles on at least one of the conveying surfaces. A control is provided that is responsive to the at least one scanning image sensor for controlling the speeds of the conveying surfaces in a manner that establishes controlled gaps between articles. The control assigns a probability estimator to individual articles sensed with the at least one scanning image sensor to establish at least one parameter of each of the articles.

An induction subsystem for a conveyor sortation system and a method of gapping articles, according to another aspect of the invention, includes providing a plurality of tandem conveying surfaces, a speed of each conveying surface being individually controllable. At least one sensor is provided for sensing articles on at least one of the conveying surfaces. A control is provided that is responsive to the at least one sensor for controlling the speeds of the conveying surface in a manner that establishes controlled gaps between articles. The control establishes a plurality of feedback-gapping algorithms. Each of the feedback-gapping algorithms is between adjacent conveying surfaces for adjusting relative speeds of those adjacent conveying surfaces as a function of at least one parameter of the articles. The control adjusts gaps between articles with the feedback-gapping algorithms beginning with a pair of adjacent conveying surfaces and cascading through adjacent pairs of conveying surfaces.

An induction subsystem for a conveyor system, and a method of gapping articles, according to another aspect of the invention, includes providing a plurality of conveyor belts, the speeds of the conveyor belts being precisely controllable. A control is provided for controlling the speeds of the conveyor belts in order to establish controlled gaps between articles. At least one scanning image sensor is provided for sensing on only a portion of the conveyor belts adjacent the at least one imaging sensor. The control adjusts the gap of articles on other conveyor belts not adjacent said scanning image sensor.

These and other objects, advantages and features of this invention will become apparent upon review of the following specification in conjunction with the drawings.

BRIEF DESCRIPTION OF THE DRAWINGS

FIG. 6 is a series of matrices for a load tracking Kalman filter;

FIGS. 9a-9c illustrate data structure of a light bar sensor;

FIG. 11 is a diagram illustrating parameters useful with a feedback gapper;

FIG. 12 is a block diagram of a feedback gapper;

FIG. 13 is a schematic diagram of the feedback-gapping algorithm used in FIG. 12.

DESCRIPTION OF THE PREFERRED EMBODIMENT

Figure 1:
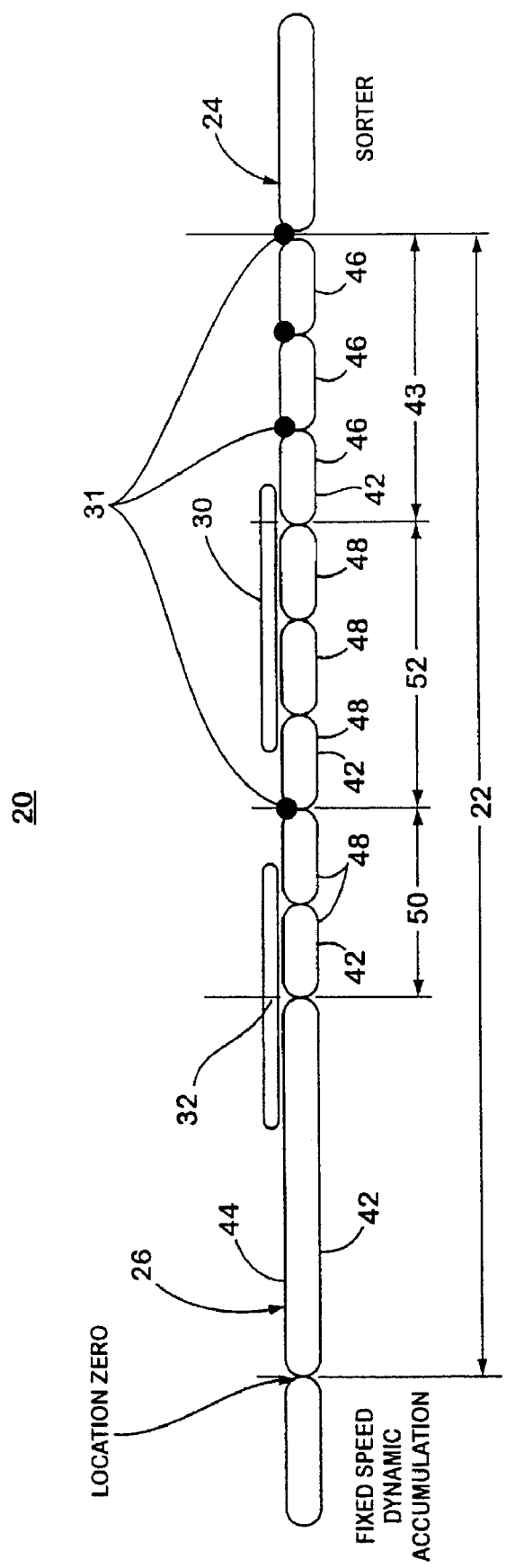
FIG. 1 is a generalized diagram of a conveyor system, including an induction subsystem and a sorter, according to an embodiment of the invention.

Referring now specifically to the drawings, and the illustrative embodiments depicted therein, a conveyor system 20 includes an induction subsystem 22 and a sorter 24. Conveyor system 20 includes a conveying surface, generally illustrated at 26 for conveying a series of articles, such as parcels, containers, totes, or the like, through the conveyor system. The conveyor system additionally includes at least one article sensor, such as a light bar 30 and/or one photo eye, or photo sensor, 31. Light bar 30 is illustrated as a scanning image sensor capable of detecting at least the leading and trailing edge of an article.

An example of such a scanning image sensor is a linear photo sensor array of the type manufactured by Kore Industries of Comstock Park, Mich. Such an imaging sensor utilizes a series of photo sensors arranged in a horizontal line which are capable of detecting objects in front of a particular photo sensor. The photo-emitters, and corresponding photo-receptors on an opposite side of the conveying surface from the photo-emitters, are actuated individually for a brief moment in a scanning fashion. The imaging sensor is a 2-meter sensor array coupled to a CAN communication interface/controller. The sensors consist of an array of IR receivers set across from an array of IR transmitters. The sensory arrays are mounted along a section of the conveyor to sense article spacing and position. The controller scans each of the four sections and provides CAN output messages representing the value of each sensor. Output messages are divided into blocks and sent over the CAN bus as raw data. The controller's flash memory may be serially programmable over an RS232 port. The controller also may have a tachometer input that could be used for article tracking. In the illustrative embodiment, 400 photo sensor elements are scanned over a 2 ms interval and are spaced apart at 5 millimeter (0.197 inch) centers. Sensor data rate is 2 ms to within 250 microseconds with no more than 100 microsecond packet-to-packet timing variation. Both CAN bus and serial interfaces may be provided. The CAN interface could provide primary sensor data transfer and run-time diagnostics. The serial channel could provide access to maintenance diagnostics functions. Physical packaging may allow direct mounting to an upper channel of the induction subsystem frame with sensor elements parallel to the conveying surface. Run-time diagnostic capability may include the ability to enter a diagnostic mode through the CAN bus interface and perform functions, such as i) sensor auto calibration, ii) download sensor trip level data, iii) set sensor characteristics, such as individual trip levels and collector cycle duration, or the like. Maintenance diagnostics may allow the run-time diagnostics to be run over the serial interface plus additional diagnostic functions. The light bars may have a range of up to 1.5 to 2.0 meters.

The scanning image sensor may receive and transmit CAN B compatible messages with an extended frame format. Each message contains up to 13 bytes of information. The first byte is reserved for frame information. It contains the Frame Format bit, Remote Transmission Request bit, and the Data Length Code. The next four bytes are Identifier Bytes used to specify the receive device ID. The remaining bytes are for message data. The output format of the light bar may send a complete scan of the sensors with as few as two bytes. This format outputs each scan starting at sensor 1 in block 0. Each output byte represents a sequence of blocked (on) or unblocked (off) sensors. Byte 1 (of Block 0) represents a count of unblocked sensors (starting at sensor 1). If the byte's value is greater than 200, the next byte of data will also represent a count of unblocked sensors. After a count is received that is less than or equal to 200, the following data byte toggles between unblocked or blocked. If the count for blocked sensors is greater than 200, the following byte will also be a count of blocked sensors else the next byte is a count of unblocked sensors. A complete scan is sent when the sum of the byte values is equal to the number of sensors (400). The bytes of data required to represent all of the sensors varies and may require more than the 8 bytes of Block 0. The same output sequence continues into the next block. This is likely if blocked and unblocked sensors are in several short sections.

The above example of a scanning image sensor is for illustration purposes only. Other scanning image sensors including line scan cameras and high frequency radar sensors, such as ultra-wideband (UWB) three-dimensional imaging sensors, could, alternatively, be used. Other examples will be apparent to those skilled in the art. In the illustrative embodiment, two imaging sensors are utilized, namely, an in-feed, or gauging, light bar 32 and a precision gapping light bar 34. However, a greater or lesser number of imaging sensors at varied locations may be utilized.

Conveying surface 26 is made up of a series of individually driven conveyor belts 42, an upper surface of which defines a portion of the conveying surface. Conveyor belts 42 are precision speed controlled and may be servo motor operated in order to follow a speed profile established by a speed control signal as is known in the art. Variable frequency drives could also be used. An example of conveyors 42 is contained in commonly assigned U.S. Pat. No. 6,513,641 B1, the disclosure of which is hereby incorporated herein by reference. It should be understood, however, that the control system disclosed herein is an enhancement to that disclosed in the '641 patent. Sorter 24, which is not part of the present invention, may be any type of known sorter, such as a carousel sorter or a linear sorter. Examples of carousel sorters include crossbelt sorters and tilt tray sorters. Examples of linear sorters include positive displacement sorters of the type disclosed in commonly assigned International Patent Publication No. WO 02/26602 A2, the disclosure of which is hereby incorporated herein by reference.

Induction subsystem 22 includes an in-feed belt 44 which is configured to draw a gap between articles such as by having a belt speed-up transition as is known in the art. This allows individual articles to be measured and controlled. Induction subsystem 22 additionally includes one or more downstream belts 46 which may be operated at a fixed speed which is set to the speed of sorter 24. In the illustrative embodiments, articles are fed to in-feed belt 44 and sorted by sorter 24 at 540 feet per minute. This requires an exceptionally responsive induction subsystem never before suggested by the prior art, especially one capable of accurately establishing small gaps between articles at a high throughput rate. Between in-feed belt 44 and downstream belts 46, induction subsystem 22 includes a series of gapping belts 48. Gapping belts 48 may be divided into one or more initial gapping and gauging, or pre-gap, belts in a pre-gap section 50 and one or more final gap belts in a final gap section 52. In the illustrative embodiments, the conveyor belts 42 in pre-gap section 50 are generally adjacent to in-feed light bar 32 while conveyor belts 42 of final gap section 52 are generally adjacent gapping light bar 34. However, advantageously, one or more conveyor belts 42 may be provided that are not adjacent a scanning image sensor 30, but which may, nonetheless, be precisely controlled in manner that will be set forth in more detail below.

As will be described in more detail below, a feedback-gapping algorithm, or feedback gapper, control loop 112 is provided between adjacent pairs of conveyor belts 42, at least in final gapping section 52. Such feedback gapping is based upon the principle of adjusting a controllable gap between articles while concurrently measuring that gap in order to provide precise gap control. Such algorithm utilizes the control point of each article which is the point at which control of the movement of the package transfers from one conveyor belt to the next conveyor belt. The control point may be measured or may be an assumed value. In this illustrative embodiment herein, a control point value is assumed. However, the measurement of a control point is disclosed in commonly assigned U.S. patent application Ser. No. 09/851,021, filed May 8, 2001, by David W. Zeitler, for a CONVEYOR INDUCT SYSTEM, the disclosure of which is hereby incorporated herein by reference.

Figure 3:
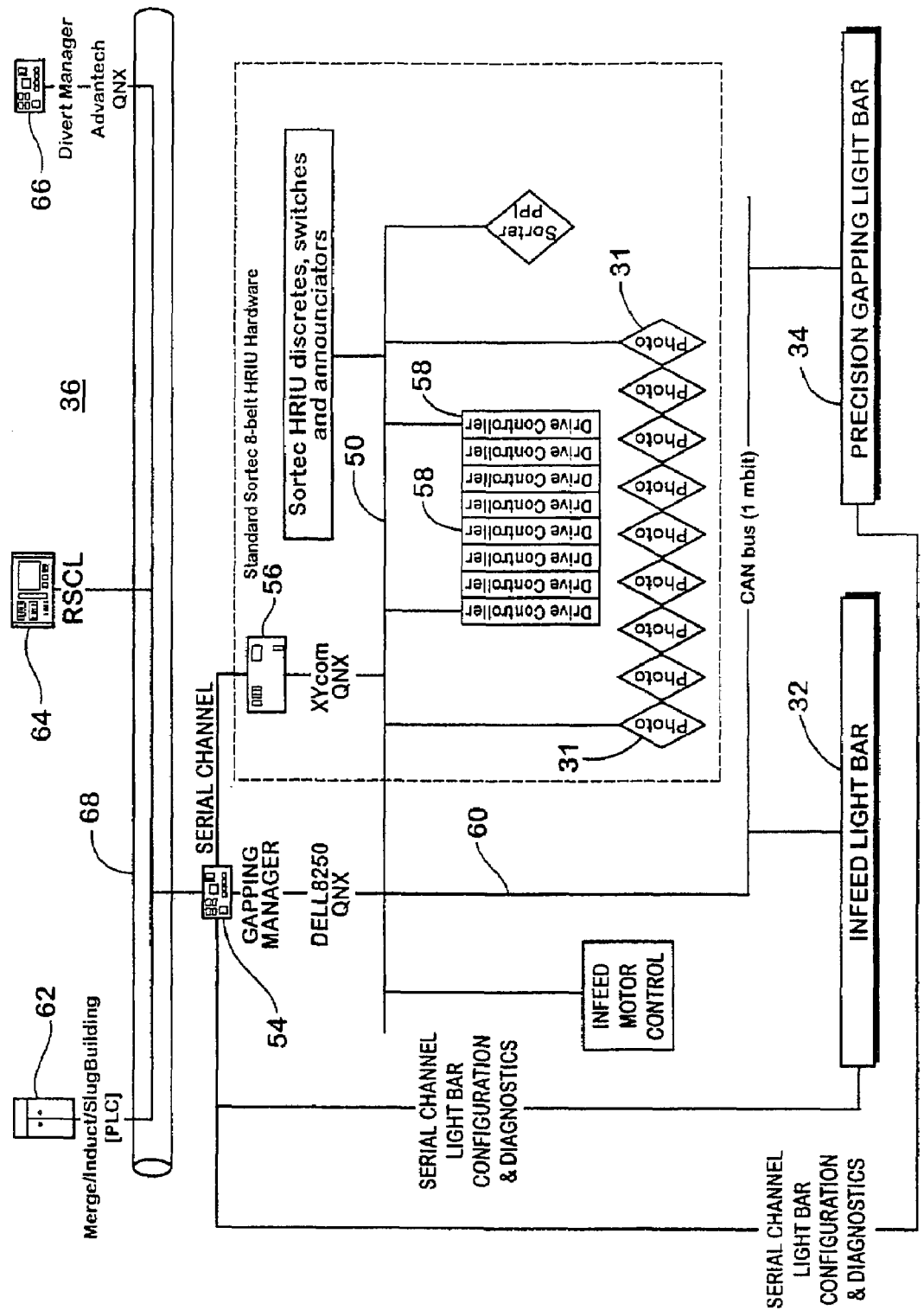
FIG. 3 is a hardware interconnect diagram for a control system.

Conveyor system 20 includes a control 36 based upon a series of bus protocols (FIG. 3). By way of example, control 36 includes a target manager computer 54 and a motor control computer 56. Motor control computer 56 may be interconnected with photo sensors 31 and drive controllers 58 for the respective conveyor belts 42 through a bus, such as an Interbus 50, or the like. Gapping manager computer 54 may be interconnected with in-feed light bar 32 and precision gapping light bar 34 through a bus, such as a CAN bus 60, or the like. Gapping manager 54 may be connected with higher level control systems, such as a merge/induct/slug building computer 62, a sort control computer 64, a divert manager 66, or the like, through a bus, such as an Ethernet bus 68, utilizing the principle set forth in commonly assigned co-pending application Ser. No. 10/163,788, filed Jun. 6, 2002, by Zeitler et al., for a TIERED CONTROL ARCHITECTURE FOR MATERIAL HANDLING, the disclosure of which is hereby incorporated herein by reference. The hardware configuration of control 36 is for illustration purposes only and other configurations could be used.

Figure 4:
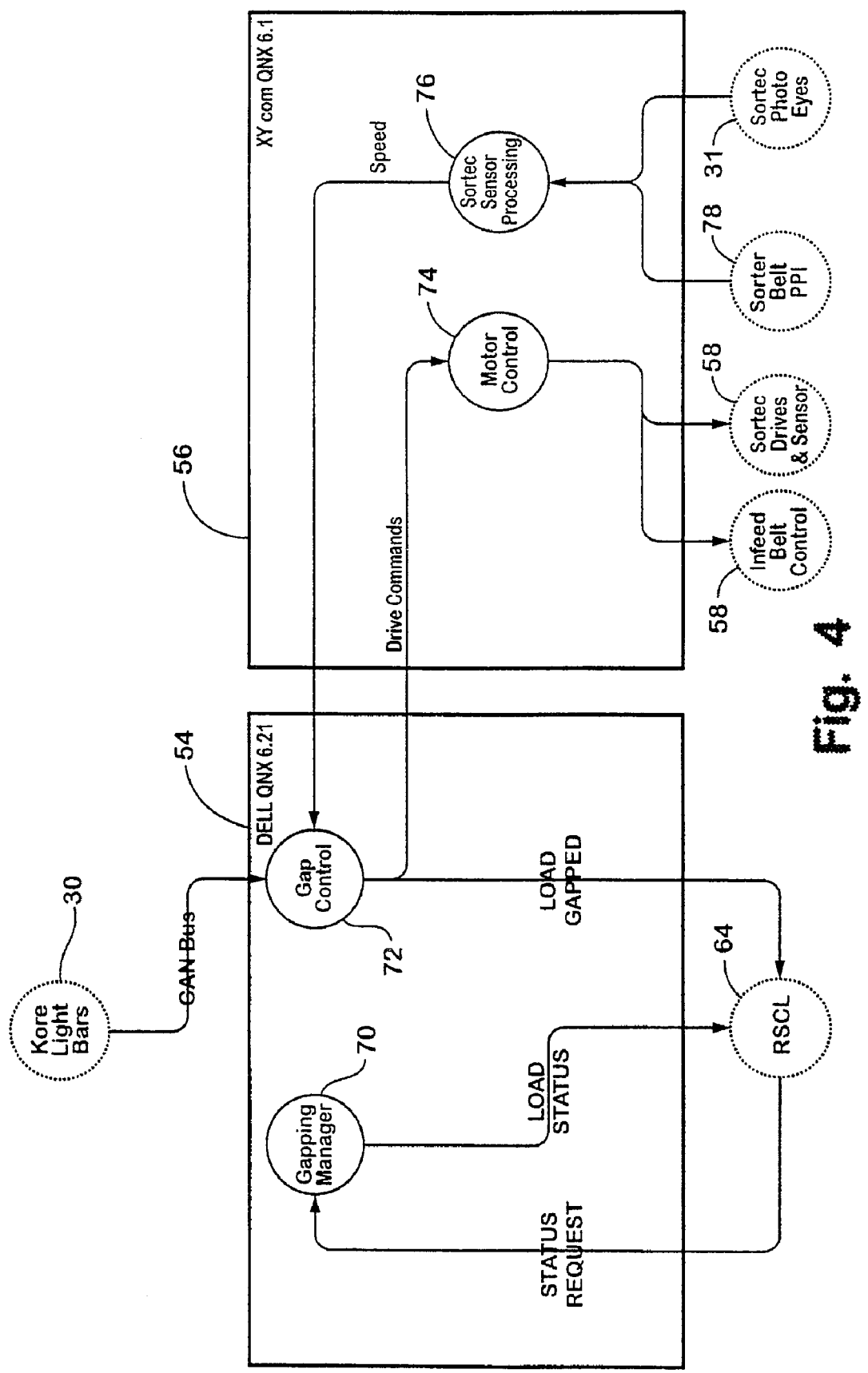
FIG. 4 is a context diagram of the control system of FIG. 3.

Referring now to FIG. 4, target manager computer 54 includes a target manager function 70. The target may be a gap between articles or a synchronization with a particular location on sorter 24 for allowing divert of closer spaced articles. Target manager computer 54 receives status requests from sort control computer 64 and sends load status information to sort control computer 64. Target manager computer 54 additionally has a target control function 72, which receives data from a scanning image sensor 30 and supplies drive commands to a motor control function 74 at motor control computer 56. Target control function 72 receives speed feedback signals from a sensor processing function 76 which informs the target control function of the speed of each conveyor belt 42 and at least final gap section 52. In the illustrative embodiment, this may be accomplished by monitoring the speed control signal fed to the individual servo control motor controlling the corresponding conveyor belt by the corresponding drive 48. However, the speed signal may also be obtained by directly monitoring the speed of the corresponding conveyor belt, such as by a position monitor 78 of the type known in the art. Speed sensing function 76 may alternatively receive inputs from photo sensors 31.

Conveyor system 20 utilizes probability estimation in order to provide more precise gapping of articles throughout the conveyor system. This is especially useful in supplying articles to sorter 24 with control gaps between the articles. In one aspect, a probability estimator is assigned to each article as that article is handled at least by induction subsystem 22. In the illustrative embodiment, the probability estimator is a Bayesian estimator, such as a Kalman filter. A Kalman filter is a linear system in which error between a desired output and the actual output is reduced when the input has a degree of uncertainty or is noisy. However, other types of probability estimators may be utilized. Once a Kalman filter 81 is assigned to an article, the feedback gappers operate on an output of the Kalman filter. The information obtained by the article sensors, namely, the scanning image sensors 30 and/or the photo sensors 31, may be utilized to increase the certainty of the state vector associated with the Kalman filter. In particular, as an article enters the induction subsystems, the covariance matrix of the associated Kalman filter rapidly stabilizes as the object is tracked by the in-feed light bar 32. As the object leaves the in-feed light bar, the covariance matrix will increase as the certainty of the state vector decreases. The further the article is from the in-feed gapping light bar, the less certain the value is of the state vector. As the object is detected by the gapping light bar 34, the covariance matrix again narrows to stable values. Because the feedback gapper operates on outputs of the Kalman filter, the feedback gapper may be utilized at pairs of conveyor belts 42 that are not adjacent a scanning image sensor 30. This allows more precise control over the gapping of the articles without requiring light bars for the entire length of the induction subsystem. Moreover, the Kalman filter may be utilized to track each object through the entire conveyor system 20, such as beyond the sorter and in other parts of the system. The filter may also be updated by outputs from photo sensors 31, both in the area between the light bars as well as areas upstream and downstream of the induction subsystem as would be understood by those skilled in the art.

Figure 14:
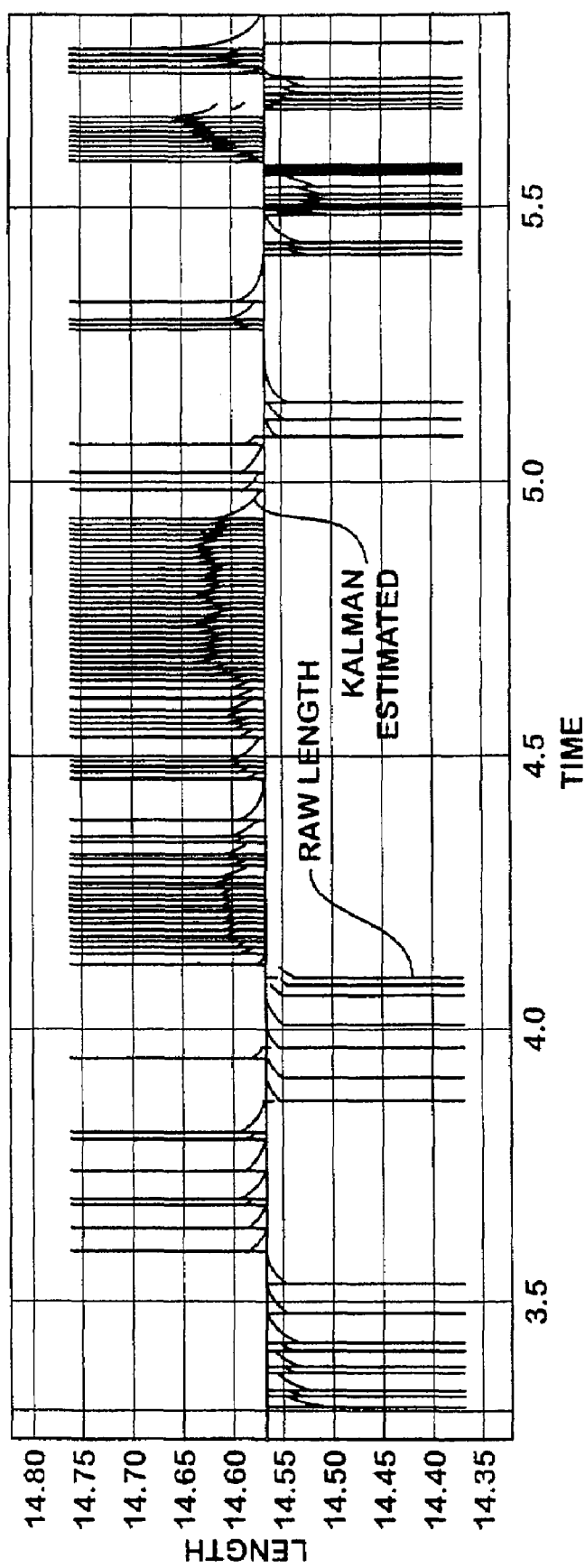
FIG. 14 is a signal diagram of an output from a light bar as processed by a Kalman filter.

A probability estimator may also be provided to smooth out the granularity of the output of a scanning image sensor 30. As can be seen by reference to FIG. 14, as an object passes over the face of a scanning image sensor, the measured length of the object would vary as the object blocks and unblocks successive photodetectors. However, by applying the output of the scanning image sensor to the Kalman filter associated with that object, the length of the object becomes a more precisely estimated parameter. This allows a more precise measurement from a coarser spacing of the photodetectors. Moreover, as the scan speed of the scanning image sensor increases and as the sensitivity of the photo sensor increases, the likelihood of a false reading from any of the photodetectors increases. The use of a probability estimator assigned to each of the articles allows a more precise interpolation of the data coming from the scanning image sensor with a reduction in false positive indications which could otherwise cause the control to identify a gap where none exists. Referring to FIG. 14, the Kalman estimated length achieves a more stable value even though the length of the article, as measured by the light bar, varies as photo detectors are blocked and unblocked. For example, reference is made to the time interval from 4 to 5 seconds where the length of the article appears to be increasing. This may be caused by the article rotating in a horizontal plane or tipping in a vertical plate. Notwithstanding this increase in measured length, the length produced by the Kalman filter is less affected.

Figure 5:
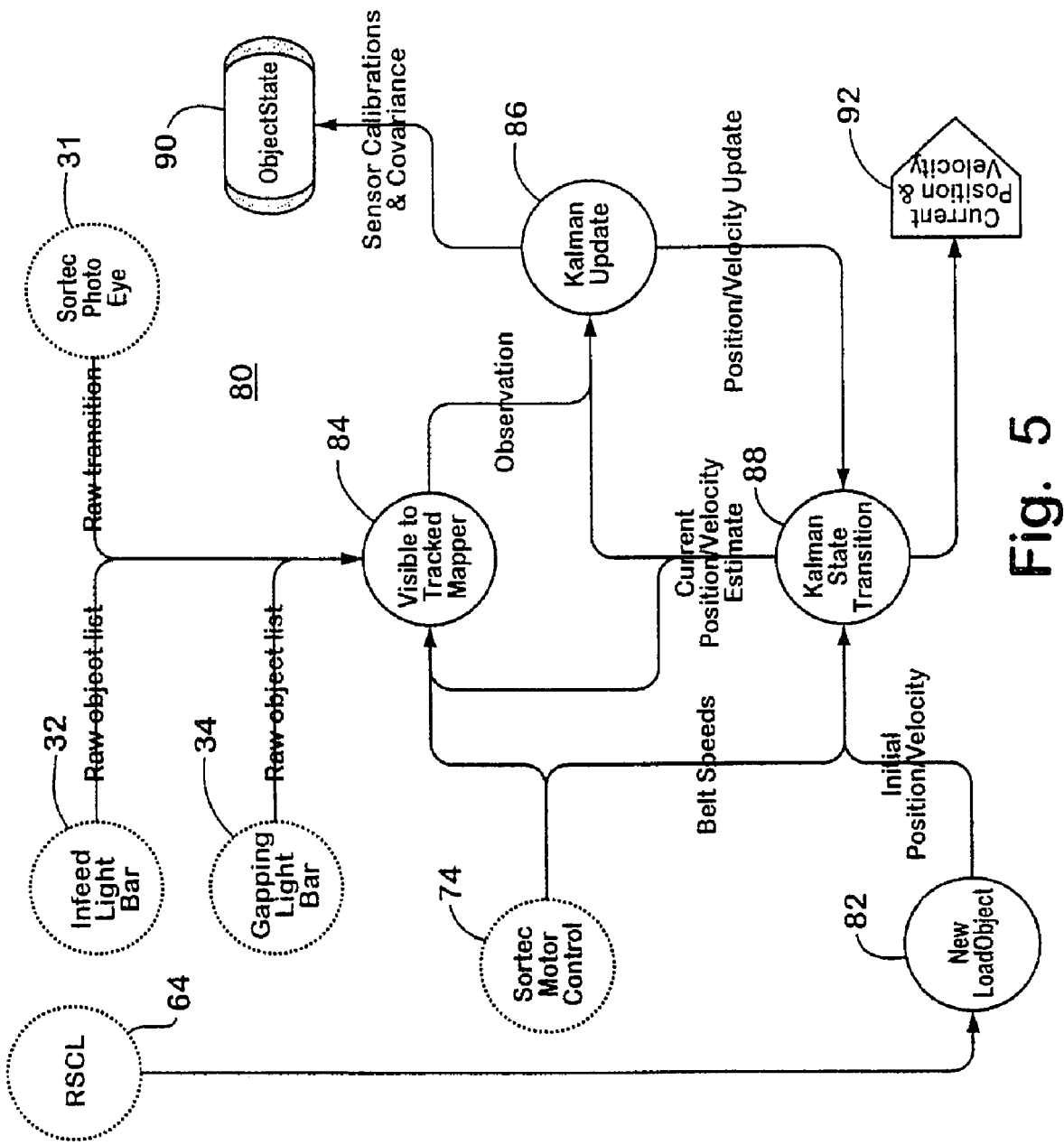
FIG. 5 is a load object-tracking diagram.

A load object tracking algorithm 80 identifies at 82 a new article, or load object, as informed by sort control computer 64 (FIG. 5). As inputs are processed from in-feed light bar 32, gapping light bar 34, and photo sensors 31, a mapper 84 maps the visible sensing of the object to a tracked object taking into account belt speed signals received from motor control function 74. The observation by mapper 84 is utilized to perform an update of the Kalman filter at 86 which provides a position and velocity update to a Kalman state transition 88. Sensor calibration and covariance data is also supplied to update the object state vector 90. The Kalman state transition 88 supplies current position and velocity data 92 for use by the feedback gapper or other functions.

Referring now to FIG. 6, Kalman filter 81 utilizes a transition matrix A, a covariance matrix Q for the Kalman state and an input covariance matrix $V_0$. Q is a measure of the intended accuracy of the values in the state matrix. $V_0$ is a measure of how accurate the inputs are believed to be. Various input matrices H are provided. The input matrices in the illustrative embodiment correspond to certain events relative to the sensing of an object by a scanning image sensor. For example, one input matrix is used when only the leading edge of the object is being detected. Another input matrix is used when the trailing edge, but not the leading edge, is being detected. A third input matrix may be provided when both the leading and trailing edges are being detected. Another input matrix (not shown) may be provided for data from photo sensors 31 to input data.

Equations $X_{t+1}$ and $Y_t$ are dynamic models that the Kalman filter is built from. The X equation represents a transition in the state matrix using covariance-based state data to transition based upon this linear equation. $Y_t$ is the equation that provides observations from the Kalman filter model.

The Kalman states maintained in the illustrative embodiment are as follows:
1) Midpoint position, i.e., position of the object center;
2) velocity of the object; and
3) length of the object.

Figure 7:
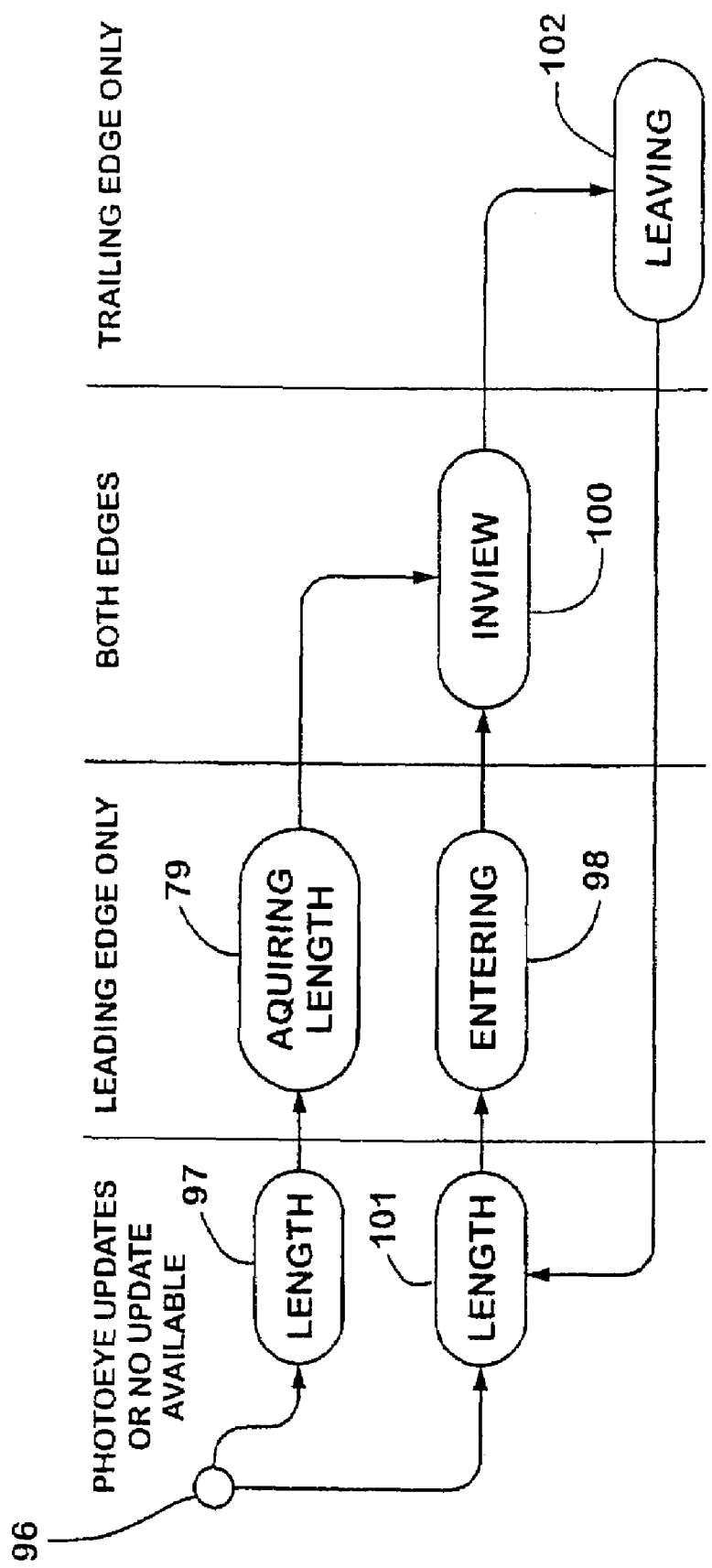
FIG. 7 is a diagram of a load object state machine.

A state machine for an object is illustrated in FIG. 7. At an initial state 96, the state variables are unknown. As the object begins entering the scanning photo sensor, if the length of the object is not known (97), the leading edge input matrix Ao begins establishing information about the object, namely, the position of the package midpoint as well as velocity and length (99). The length may either be assumed or may start from zero and build as the leading edge travels across the scanning imaging sensor. At state 100, the object is in full view of the scanning imaging sensor and both edges input matrices are used to input data on that object. As the leading edge passes past the scanning imaging sensor, a leaving state 102 is entered and the trailing edge only input matrices are used to input data to Kalman filter. If the length of the article is known (101), a matrix A is used to input further information (98).

Figure 8:
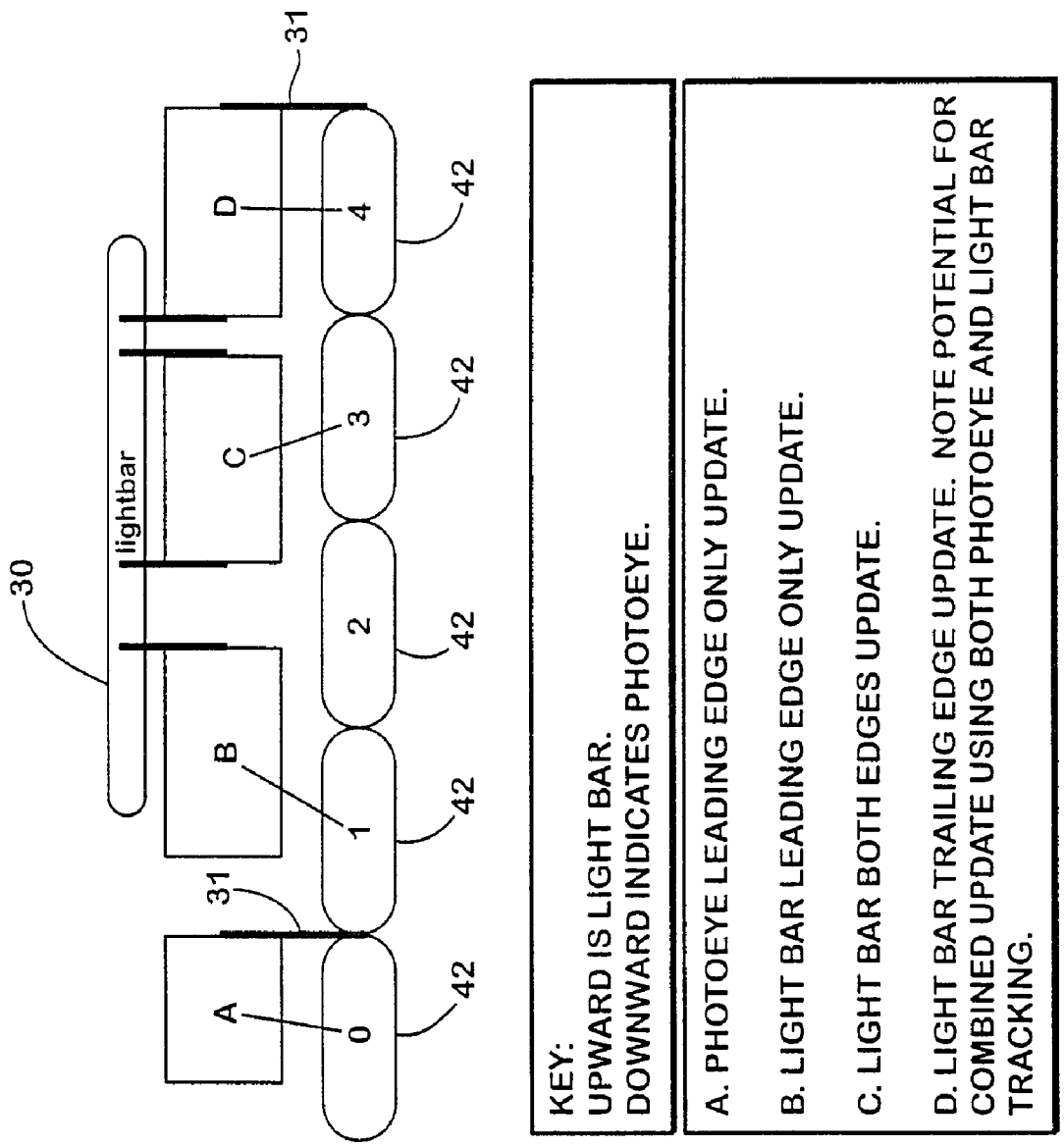
FIG. 8 is a generalized diagram of sensing of an object with a sensor.

FIG. 8 illustrates the use of photo sensor 31, in addition to, or alternative of, the scanning image sensor to update the Kalman filter. Referring now to FIG. 8, the leading edge of object A is illustrated as being updated by a photo sensor 31 while light bar 30 is updating the leading edge data of objects B and D and the leading and trailing edge data of object C. The leading edge of object D is being updated by a photo sensor 31 while its trailing edge is being updated by light bar 30. Thus, it is seen that additional data may be obtained by utilizing scanning input sensors and/or conventional photo sensors.

In addition to applying a probability estimator to each object processed by conveyor system 20, control 36 may utilize a probability estimator to identify objects. Decision logic may be applied to an output of scanning image sensor 30 in order to improve the confidence in the detection of individual objects. Such decision logic is an attempt to overcome false gaps, such as may be caused by the reflection of a photodetector beam off of a shiny surface, or the like, or the inability of the scanning image sensor to detect a gap. Referring to FIGS. 9a-9c, articles L1-L5 are shown moving past a scanning imaging sensor 30. It can be seen that articles L1, L2 and L3 are together without gaps and articles L4 and L5 are separated from each other and from article L3. FIG. 9b shows a possible output from scanning imaging sensor 30 for this arrangement. The unprocessed article information shows that articles L1, L2 and L3 are, indeed, generally considered to be one article, except that a false gap has been established somewhere along article L3. Therefore, the output of the sensor would suggest that there are two articles L1 and L2. Also, a false gap has arisen in the sensing of article L4 and a false load is shown as article L5. Article L5 is, therefore, identified as article L6. FIG. 9c illustrates the way in which the Bayesian logic attempts to remove the false gaps and the false load. By comparing trailing and leading edges, the Bayesian logic is intended to identify the false gap between articles L1 and L2 such that object number 3 is correctly identified as a combination of articles L1, L2 and L3. Also, the false gap in article L4 is identified so that object number 2 corresponds with article L4. Also, the short article L5, which is the false load, is detected and eliminated and article L6 becomes object number 1 which is intended to be original article L5. While it may not be possible to detect false gaps and false loads under all circumstances, the use of decision logic substantially reduces such false gaps and false loads. Thereby, when an object is assigned in the system and a Kalman filter is assigned to that object, a more reliable tracking may occur.

Figure 10:
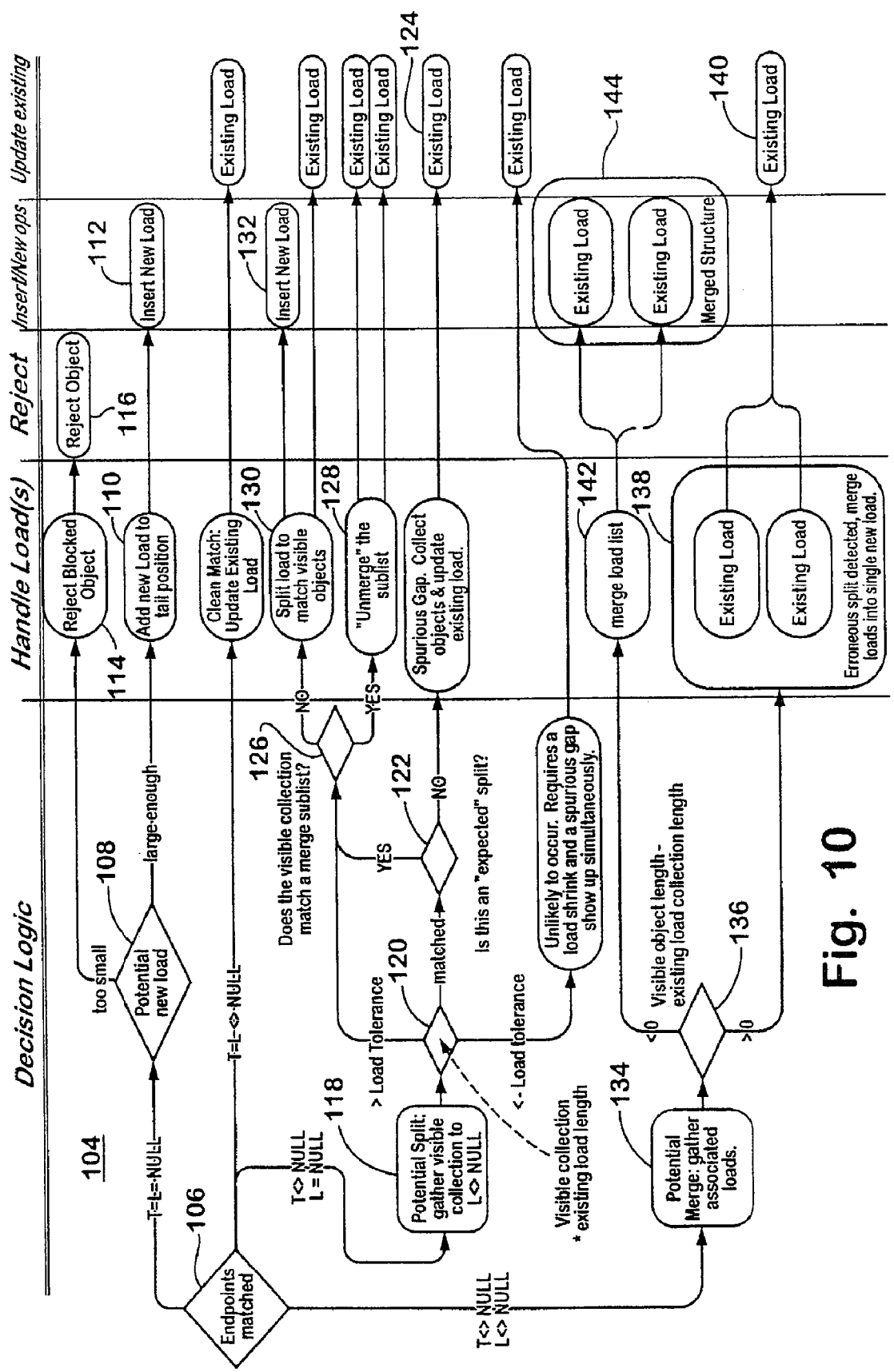
FIG. 10 is an object identification logic diagram.

An example of decision logic 104 is illustrated in FIG. 10. Logic 104 begins at 106 by matching end points (T=trailing; L=leading) with the end points that were previously identified. If either the trailing or the leading end points are not matched, a null condition exists. If both the trailing and leading edges are not matched, a potential new load is identified at 108. If it is large enough, it is added as a new load at 110 and inserted at 112 as a new load. If it is determined at 108 that the new load is too small, the object is blocked at 114 and rejected at 116. If the leading edges do not match, but the trailing edges do match, a potential split is identified at 118. If the visible light collected is determined at 120 to be less than a particular amount, it is determined at 122 that a split has likely not occurred and the existing load is updated at 124. If it is determined at 120 that the potential split is greater than a particular amount, a merge list is consulted at 126. If a match is found in the merge sub-list, the objects are unmerged at 128. If not, the load is split at 130 and a new load is created at 132.

If it is determined at 106 that both the trailing and leading edges are matched, a potential merge of articles is identified at 134. If it is determined at 136 that the visible object length is greater than the existing load collection length, it is concluded at 138 that an erroneous split has been detected and the existing load is re-established at 140. If it is determined at 136 that the existing load collection length is greater than the visible object length, the object is added to merge load list at 142 and a merged structure is identified at 144. The example of operation of decision logic 104 is for illustration purposes only. Other logic diagrams could be crafted. However, the result is to obtain more confidence in the visible object identification with the scanning image sensor. It provides the ability to identify when loads merge or when merged loads separate. Also, the decision logic may be in the form of Bayesian logic to enhance the functioning of the logic. Bayesian logic uses probability inference to further reduce false loads and false gaps by providing likely states in the future based upon past information.

Figure 2:
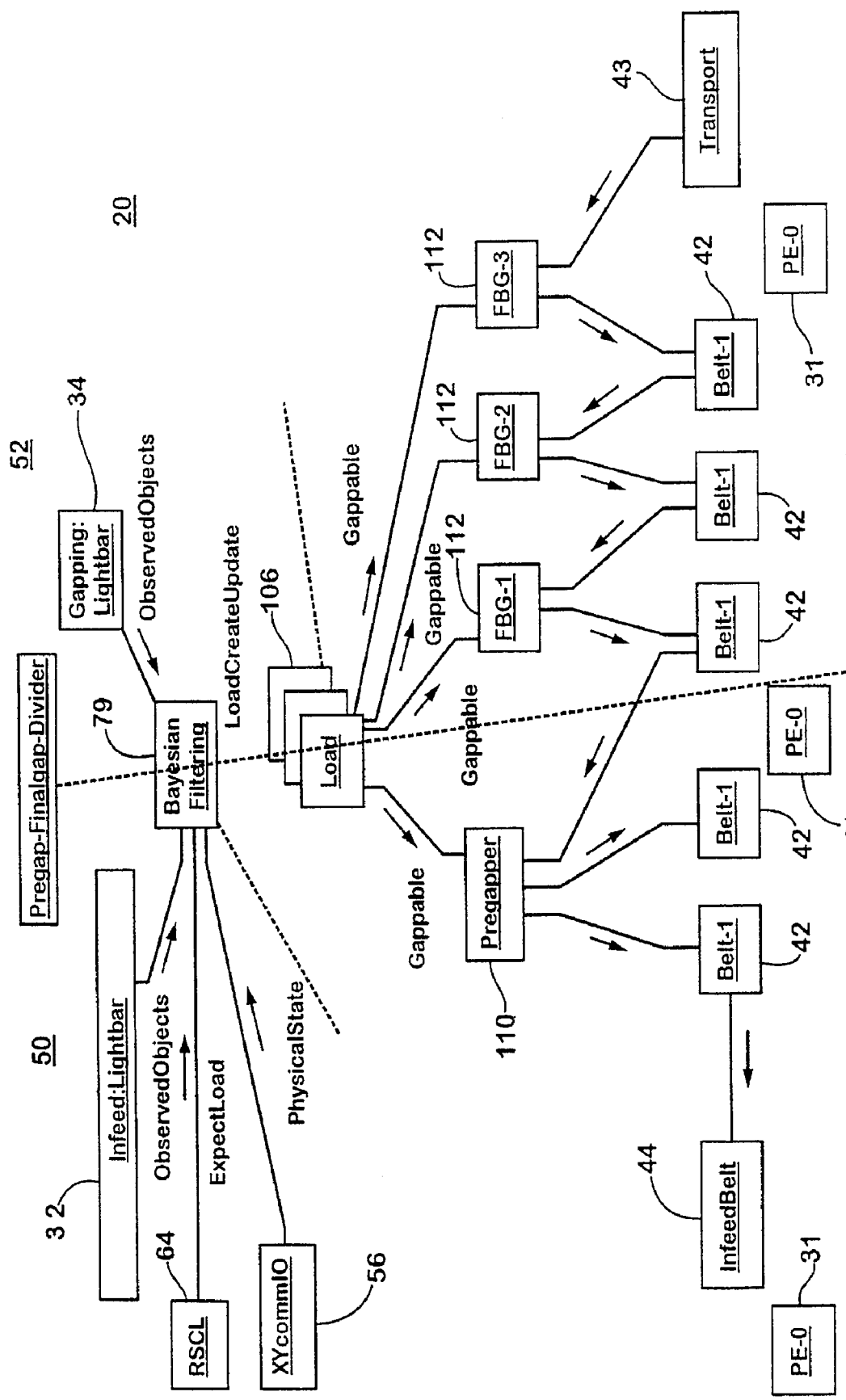
FIG. 2 is a logic diagram of top-level objects and interactions for the conveyor system in FIG. 1.

Referring now to FIG. 2, with the physical state of objects and the conveyor system being identified by motor control computer 56 and the expected objects, or loads, supplied by sort control computer 64, a probability estimator in the form of Bayesian filtering 79 is applied to outputs to in-feed light bar and gapping light bar 34. Bayesian filtering 79 includes decision logic 104 applied to the outputs of the light bars as well as assignment of Kalman filters 81 to the objects. As a result, individual loads 106 are created and updated as shown at 106. As previously set forth, induction subsystem 22 may be divided into a pre-gap section and a final gap section 52. While illustrated in physical proximity, it should be understood that sections 50 and 52 might be physically separated. For example, should the output of final gap section 52 be supplied directly to sorter 24 without any speed changes or turns, or the like, pre-gap section 50 and final gap section 52 may be in close proximity with the objects being supplied directly from final gap section 52 to the sorter. If there is not enough floor space directly in line with the sorter to accommodate the entire induction subsystem, the pre-gap section and final gap section may be separated. For example, if the equipment layout requires that a turn be required upstream of a sorter, pre-gap section 50 may be provided upstream of the turn. The pre-gap section would identify parameters of the loads and may also separate the articles that are not necessarily properly gapped but with a proper amount of cumulative gap between the products. The articles would then be transported such as through the turn or speed change to the final gap section 52, which should be located immediately upstream of the sorter. The final gap section would then provide appropriate gaps between the articles or objects. Also, as will be discussed in more detail below, the final gap section can target articles by either providing a target gap between the articles, or by synchronizing an edge of the article with a particular slat, or position on a slat of sorter 24.

It should be understood that, although uniform gaps, such as 3½-inch gaps, or the like, may be desired, induction subsystem 22 is capable of supplying different length gaps between different types of objects. For example, utilizing the principle disclosed in commonly assigned U.S. Pat. Nos. 5,927,465; 6,041,909 and 6,513,642 B1, the disclosures of which are incorporated herein by reference, a small gap may be provided between packages of medium size. Packages that are relatively small may require a larger gap on both ends in order to accommodate at least two pusher shoes for the article. Very large packages may also require a larger gap in order to rotate the packages for a diagonal divert. Although a 3½-inch gap is an example of nominal gap, it should be understood that induction subsystem 22 is capable of gaps that may be much smaller and potentially as small as 0.050 inch. It is possible that such gaps may be established with an accuracy of plus or minus 0.050 inch. This allows throughput of greater than 300 standard cartons per minute and may even provide for 400 standard cartons per minute.

Load information from 106 is sent to a pre-gap algorithm 110 and a series of feedback-gapping algorithms 112, all of which are defined in software run on target manager computer 54. In the final gap section 52, each transition from a belt 42 to an adjacent belt 42 and from belt #5 to transport conveyor 43 is a feedback gapper. The control 36 starts with fixed speed transport belt 43 and manipulates the speed on the prior belt #5 to change the gap towards a target gap. Then, feedback gapper FBG-2 uses the speed of belt #5 as a basis for determining a speed of belt #4 at the belt #4/belt #5 transition. Then, feedback gapper FBG-1 uses the speed of belt #4 as a basis for determining a speed of belt #3 at the belt #3/belt #4 transition. Although feedback gappers are illustrated only in the final gap section 52, it should be understood that feedback gappers could also be provided between any belt-to-belt interface as well. Alternatively, as illustrated in FIG. 2, pre-gapper 110 may adjust gaps between loads for the purpose of establishing an average gap between the loads that can be adjusted by the final gap section 52 to precision gaps between the articles. As previously indicated, pre-gap section 50 and final gap section 52 may be immediately adjacent each other or may be separated by other transport conveyors, such as turn conveyors, and the like.

The arrangement of the feedback gappers 112 provides a cascading feedback arrangement, wherein gapping of articles begins with a downstream conveyor, such as transport conveyor 43, and cascades through adjacent pairs of conveying surfaces in an upstream direction, from the vantage of article movement, toward pre-gap section 50 or entry belt 44 depending upon the nature of the pre-gapping section. This process occurs as follows. For each feedback gapper, the control determines whether any package has its control point on the upstream conveyor belt 42. If so, the control selects the most downstream package on that belt and evaluates the gap error in front of it. The control comes up with a ratio of speeds, or relative belt velocity, based upon the gapping error. The speed difference, or ratio speeds, is based upon the amount of gap error. Such ratio may be determined as follows:

Ratio=1+(gap error)·(gain)

Thus, the process walks through each feedback gapper and looks at the upstream conveyor. By providing a significant number of conveyor belts 42, the controller has more opportunities to correct large gapping errors by making small changes on each unit.

The feedback gapper utilizes a feedback-gapping algorithm, which, in the illustrative embodiment, operates on outputs of the Kalman filter assigned to the respective loads. This operation on the Kalman filter is especially useful when the load is between light bars. Referring now to FIG. 11, a feedback gapper is illustrated as it applies to a master conveyor belt B1 and a slaved conveyor belt B2. A lead article L1 has its control point P1 on the master conveyor, and a trailing article L2 has its control point P2 on the slaved conveyor. The articles are separated by a gap G. With this arrangement, the feedback gapper 112 utilizes a first feedback belt feedback control algorithm 114 which receives an input 116 of the measured gap G and receives another input 118 of the final belt velocity of the downstream, master, belt. A feedback algorithm 120 on the downstream belt receives an input 122 of the sorter velocity in an input 124 of the gap as measured instantaneously. The feedback algorithms 114 and 120 operate to determine a velocity 126 of the slave belt B2. This is determined by examining a gap error 127 and to determine at 128 whether the gap error is within a particular tolerance, known as the "dead zone." If the gap error is within the dead zone, no further action is taken. If the gap error is not within the dead zone, it is amplified by an amplifier 130 having a gain and the output of amplifier 130 is combined with velocity V1 of the master conveyor to arrive at a velocity V2 of the slaved conveyor at 126. After the feedback-gapping algorithm is applied to the downstream-most pair of belts, the same process is repeated with the adjacent upstream interface in order to adjust the speed of the slave belt for that interface. This process is cascaded upstream opposite the direction of article movement. In the illustrative embodiment, the feedback process is cascaded through the induction subsystem and then repeated. In the illustrative embodiment, the update rate is 10 ms.

Control 36 utilizes a gap selection process by identifying an active gap between loads associated with a belt transition. The active gap, in the illustrative embodiment, is the gap in front of, or downstream of, the most downstream package on the belt upstream of the belt transition. The feedback gapper for that belt transition is assigned to the active gap identified with that belt transition. As would be appreciated by those skilled in the art, numerous active gaps may be present on inductions of subassembly 22 at any one time and, indeed, numerous active gaps may be present in front of each scanning image sensor 30 at a time. However, control 36 is programmed to identify which feedback gappers are able to adjust which gaps as would be well within the skill of the average artisan.

In one particular embodiment, final gap section 52 may optionally be capable of a sync mode in which a package is placed at a particular position with respect to a physical slat of sorter 24. This may be accomplished by coordination with the sorter control, which would be aware at all times of the identity and location of each slat. As each belt 42 is driven through an active feedback gapping relationship to the belt in front of it, the feedback may be active sensing or it may be based upon the movement that the system anticipates of the load. In areas between the in-feed light bar 32 and gapping light bar 34, updates to the Kalman filter may not take place or may be carried out by the photo sensors 31. By tracking not only the edges and the velocity of each load, but also the velocity of the belt that is believed to be controlling the speed of the load, an improved accuracy may be obtained. A feedforward component is defined to the filter operation to help predict what the control believes the velocity of the load should be. The belt velocity tends to propel packages forward, and, thereby, knowledge of the velocity allows the system to track the load more accurately. If the Kalman filter determines that the filter velocity of the belt is different from the velocity of the package, the Kalman filter may take that into account in expecting that the package will accelerate, or decelerate, and thereby may more quickly track changes in acceleration/deceleration.

In one embodiment, the gains of the feedback gappers may not all be the same. The gain may be higher for the most-downstream feedback gapper and decrease for successive upstream feedback gappers. This dampens velocity changes and impedes these changes from getting amplified and rapidly propagating upstream in a "whiplash" fashion. Also, acceleration limits for the belts may be lower for the most-downstream belt and increase for successive upstream belts. This allows larger target adjustments to be made earlier on the induction subassembly while providing for more precise target adjustments that are achieved more gently toward the discharge. Also, target error correction may be limited in other ways. For example, distributed error correction distribution may distribute the total amount of error to be corrected over the length of the induction subsystem. This ensures that an error correction will be complete before the article exits to the next belt. This provides for "smoother" and therefore more optimal load transition.

In the illustrative embodiment, a particular combination of scanning imaging sensors and photo sensors is illustrated. However, it should be understood that it is possible to obtain satisfactory results with other combinations of scanning imaging sensors and/or photo sensors. Indeed, in some embodiments, photo sensors alone may be sufficient. If it is desired to measure the control point of the package, in the manner described in application Ser. No. 09/851,021, filed May 8, 2001, by David W. Zeitler, entitled CONVEYOR INDUCT SYSTEM, then at least an in-feed light bar 32 would be used to measure the control point and possibly also to establish load parameters. The use of probability estimators applied to each of the loads allows significant flexibility in system layout by allowing updates to the Kalman filter to be distributed according to the required accuracy at particular parts of the system. Advantageously, as illustrated herein, it is possible to conduct feedback gapping between belt transitions without the requirement for sensing loads while the feedback gapping process is occurring. This is achieved by applying the feedback gap processing to outputs of the Kalman filters assigned to the respective loads. Moreover, the present invention allows more accurate tracking of loads than is achievable by even scanning imaging sensors alone. This is because the probability estimation smoothes out the granularity of the light bar sensors and provides precise interpolation of data which is even a more precise estimate of the true location of the load than can be achieved from the outputs of the light bar signal alone. The present invention also provides the ability to reduce false positive readings of a gap and false positive readings of a load.

Control 36 may be structured such that the number of belts 42 and, therefore, the number of transitions between belts and feedback gappers as well as the number of scanning imaging sensors and photo sensors is readily configurable for a particular application. In the illustrative embodiment, an 8-belt unit is illustrated. Such unit, commercially available as a High Rate Induction Unit (HRIU) from Sortec of Italy, is utilized. However, a greater, or fewer, number of belts may be utilized. Also, other hardware may be used for carrying out the invention.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. An induction subsystem for a conveyor sortation system, said induction subsystem comprising:
    a conveying surface defining a plurality of tandem conveying surface portions, wherein speeds of said conveying surface portions are individually controllable;
    at least one sensor for sensing at least one parameter of articles on at least one of said conveying surface portions; and
    a control responsive to said at least one sensor, said control adapted to determine relative positions of articles on said conveying surface as a function of said at least one parameter, said control adapted to adjust the speeds of said conveying surface portions in a manner that repeatedly controls relative positions of articles on said conveying surface, wherein said control is adapted to adjust the relative positions of particular articles in response to adjustments made to the relative positions of other articles, said control defining a plurality of feedback-gapping algorithms, each of said feedback-gapping algorithms defined between adjacent conveying surface portions for adjusting relative speeds of those adjacent conveying surface portions as a function of the relative positions of the articles on those adjacent conveying surface portions, wherein said control repeatedly controls relative positions of all articles on said conveying surface with said feedback-gapping algorithms beginning with a pair of adjacent conveying surface portions and cascading through adjacent pairs of adjacent conveying surface portions.

2. The induction subsystem of claim 1 wherein said control controls relative positions of articles beginning with a downstream pair of adjacent conveying surface portions that are downstream relative to article movement and cascading upstream relative to article movement through adjacent pairs of adjacent conveying surface portions.

3. The induction subsystem of claim 2 including a feedback gapping algorithm between one of said downstream adjacent conveying surface portions and a fixed speed conveying surface portion that is downstream of said downstream adjacent conveying surface portions.

4. The induction subsystem of claim 1 wherein said control assigns probability estimators to individual articles sensed with said at least one sensor to establish said at least one parameter of each of the articles and wherein said feedback-gapping algorithms operate on an output of said probability estimators.

5. The induction subsystem of claim 4 wherein said probability estimators comprise Bayesian estimators.

6. The induction subsystem of claim 5 wherein said Bayesian estimators comprise Kalman filters.

7. The induction subsystem of claim 1 wherein said at least one parameter comprises at least one chosen from article position and article velocity.

8. The induction subsystem of claim 1 wherein said at least one parameter comprises a plurality of parameters, said parameters comprising article position, article length and article velocity.

9. The induction subsystem of claim 1 wherein said at least one sensor comprises at least one scanning image sensor.

10. The induction subsystem of claim 9 wherein said at least one scanning image sensor comprises at least two scanning image sensors.

11. The induction subsystem of claim 10 wherein said at least two scanning image sensors are separated from each other by at least one of said conveying surface portions, said control operating on an output of the probability estimator for an article while that article is on said at least one of said conveying surface portions.

12. The induction subsystem of claim 11 wherein at least one of said feedback-gapping algorithms operating on said output of said probability estimator is adapted to control that article on said at least one of said conveying surface portions.

13. The induction subsystem of claim 1 wherein said at least one sensor comprises at least one scanning image sensor sensing at least one parameter of individual articles, said at least one scanning image sensor sensing articles at those of said conveying surface portions that are adjacent said at least one scanning image sensor, said control controlling relative positions of articles on other conveying surface portions that are not adjacent said scanning image sensor based upon the at least one parameter of the articles sensed with said sensor, said at least one parameter chosen from article position and article velocity.

14. A method of inducting articles at a conveyor sortation system, said method comprising:
    providing a conveying surface defining a plurality of tandem conveying surface portions, wherein speeds of said conveying surface portions are individually controllable;
    providing at least one sensor for sensing at least one parameter of articles on at least one of said conveying surface portions; and
    controlling the speeds of said conveying surface portions in a manner that repeatedly controls relative positions of articles on said conveying surface, including controlling relative positions of particular articles in response to adjustments made to the relative positions of other articles, said controlling including defining a plurality of feedback-gapping algorithms, each of said feedback-gapping algorithms between adjacent conveying surface portions for adjusting relative speeds of those adjacent conveying surface portions as a function of the relative positions of the articles on those adjacent conveying surface portions, including repeatedly controlling relative positions of all articles on said conveying surface with said feedback-gapping algorithms beginning with a pair of adjacent conveying surface portions and cascading through adjacent pairs of adjacent conveying surface portions.

15. The method of claim 14 including controlling relative positions of articles beginning with a downstream pair of adjacent conveying surface portions that are downstream relative to article movement and cascading upstream relative to article movement through adjacent pairs of adjacent conveying surface portions.

16. The method of claim 15 including defining a feedback gapping algorithm between one of said downstream adjacent conveying surface portions and a fixed speed conveying surface portion that is downstream of said downstream adjacent conveying surface portions.

17. The method of claim 14 including assigning probability estimators to individual articles sensed with said at least one sensor to establish said at least one parameter of each of the articles and wherein said feedback-gapping algorithms operate on an output of said probability estimators.

18. The method of claim 17 wherein said probability estimators comprise Bayesian estimators.

19. The method of claim 18 wherein said Bayesian estimators comprise Kalman filters.

20. The method of claim 14 wherein said at least one parameter comprises at least one chosen from article position and article velocity.

21. The method of claim 14 wherein said at least one parameter comprises a plurality of parameters, said parameters comprising article position, article length and article velocity.

22. The method of claim 14 wherein said at least one sensor comprises at least one scanning image sensor.

23. The method of claim 22 wherein said at least one scanning image sensor comprises at least two scanning image sensors.

24. The method of claim 23 wherein said at least two scanning image sensors are separated from each other by at least one of said conveying surface portions and including operating on an output of the probability estimator for an article while that article is on said at least one of said conveying surface portions.

25. The method of claim 24 wherein at least one of said feedback-gapping algorithms operating on said output of said probability estimator to control that article on said at least one of said conveying surface portions.

26. The method of claim 14 wherein said at least one sensor comprises at least one scanning image sensor sensing at least one parameter of individual articles, said at least one scanning image sensor sensing articles at only those of said conveying surface portions that are adjacent said at least one scanning image sensor and including controlling relative positions of articles on other conveying surface portions that are not adjacent said scanning image sensor based upon the at least one parameter of the articles sensed with said sensor, said at least one parameter chosen from article position and article velocity.

* * * * *